US011062168B2

(12) United States Patent
Bredno et al.

(10) Patent No.: US 11,062,168 B2
(45) Date of Patent: Jul. 13, 2021

(54) SYSTEMS AND METHODS OF UNMIXING IMAGES WITH VARYING ACQUISITION PROPERTIES

(71) Applicant: Ventana Medical Systems, Inc., Tucson, AZ (US)

(72) Inventors: Joerg Bredno, San Francisco, CA (US); Jim F. Martin, Mountain View, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 92 days.

(21) Appl. No.: 16/010,389

(22) Filed: Jun. 15, 2018

(65) Prior Publication Data

US 2018/0293456 A1    Oct. 11, 2018

Related U.S. Application Data

(63) Continuation of application No. PCT/EP2016/081329, filed on Dec. 16, 2016.
(Continued)

(51) Int. Cl.
*G06K 9/00* (2006.01)
*G06K 9/46* (2006.01)
(Continued)

(52) U.S. Cl.
CPC ....... *G06K 9/4652* (2013.01); *G06K 9/00134* (2013.01); *G06K 9/036* (2013.01);
(Continued)

(58) Field of Classification Search
CPC ..... G06T 11/001; G06T 7/90; G06K 9/00523; G06K 9/6223
(Continued)

(56) References Cited

U.S. PATENT DOCUMENTS 8,781,250 B2   7/2014   Zitnick et al.
8,831,327 B2   9/2014   Santamaria-Pang et al.
(Continued)

FOREIGN PATENT DOCUMENTS

CN    104200428 A    12/2014
JP    2003-233813 A    8/2003
(Continued)

OTHER PUBLICATIONS

Gavrilovic et al, Blind Color Decomposition of Histological Images, IEEE Transactions on Medical Imaging, Jun. 2013, pp. 983-994, vol. 32, No. 6.
(Continued)

*Primary Examiner* — Stephen P Coleman
(74) *Attorney, Agent, or Firm* — Kilpatrick Townsend & Stockton LLP

(57) ABSTRACT

Systems and methods for unmixing of multichannel image data in the presence of locally varying image characteristics. Feature images created from a multi-channel input image form a feature vector for each pixel in the input image. Feature vectors are classified based on the local image characteristics, and areas are formed in the input image that share local image characteristics. Each area is unmixed separately using reference vectors that were obtained from regions in example images that have the same image characteristics. The unmixing results are combined to form a final unmixing result image created from the individually unmixed image areas.

14 Claims, 9 Drawing Sheets

Related U.S. Application Data

(60) Provisional application No. 62/269,767, filed on Dec. 18, 2015.

(51) Int. Cl.
*G06K 9/62* (2006.01)
*G06K 9/34* (2006.01)
*G06K 9/03* (2006.01)
*G06T 7/00* (2017.01)

(52) U.S. Cl.
CPC ............ *G06K 9/34* (2013.01); *G06K 9/4619* (2013.01); *G06K 9/624* (2013.01); *G06K 9/6218* (2013.01); *G06K 9/6255* (2013.01); *G06K 9/6257* (2013.01); *G06K 9/6267* (2013.01); *G06T 7/0012* (2013.01); *G06K 2209/05* (2013.01); *G06T 2207/10024* (2013.01); *G06T 2207/10056* (2013.01); *G06T 2207/20021* (2013.01); *G06T 2207/20032* (2013.01); *G06T 2207/20081* (2013.01); *G06T 2207/20212* (2013.01); *G06T 2207/30024* (2013.01)

(58) Field of Classification Search
USPC .......................................................... 382/128
See application file for complete search history.

(56) References Cited

U.S. PATENT DOCUMENTS

| | | | |
|---|---|---|---|
| 8,948,488 B2 | 2/2015 | Can et al. | |
| 2005/0232483 A1* | 10/2005 | Kato | G06K 9/00375 |
| | | | 382/171 |
| 2005/0266395 A1 | 12/2005 | Gholap et al. | |
| 2009/0303375 A1* | 12/2009 | Ohyama | H04N 5/272 |
| | | | 348/333.12 |
| 2010/0054597 A1* | 3/2010 | Dhawan | G06T 7/0002 |
| | | | 382/173 |
| 2010/0288910 A1 | 11/2010 | Robinson et al. | |
| 2011/0026803 A1 | 2/2011 | Can et al. | |
| 2011/0122276 A1* | 5/2011 | Hillis | G02B 27/40 |
| | | | 348/222.1 |
| 2016/0253817 A1* | 9/2016 | Chen | G06T 7/11 |
| | | | 382/133 |

FOREIGN PATENT DOCUMENTS

| | | |
|---|---|---|
| JP | 2005-056282 A | 3/2005 |
| JP | 2007-514248 A | 5/2007 |
| JP | 2007-164772 A | 6/2007 |
| JP | 2010-169592 A | 8/2010 |
| JP | 2011-095225 A | 5/2011 |
| JP | 2013-020212 A | 1/2013 |
| JP | 2013-238459 A | 11/2013 |
| JP | 2014-525252 A | 9/2014 |
| JP | 2016-533475 A | 10/2016 |
| WO | 2004111930 A2 | 12/2004 |
| WO | 2009158209 A2 | 12/2009 |
| WO | 2013071003 A1 | 5/2013 |
| WO | 2014140085 A1 | 9/2014 |
| WO | 2014195193 A1 | 12/2014 |
| WO | 2015044419 A1 | 4/2015 |

OTHER PUBLICATIONS

International Search Report and Written Opinion dated Mar. 14, 2017 in corresponding PCT/EP2016/081329 filed Dec. 16, 2016, pp. 1-14.

Jenzri et al., Robust Context Dependent Spectral Unmixing, IEEE Computer Scoiety 2014 22nd International Conference on Pattern Recognition, 2014, pp. 643-647.

Ruifrok et al., Quantification of Histochemical Staining by Color Deconvolution, Analytical and Quantitative Cytology and Histology, Aug. 2001, pp. 291-299, vol. 23, No. 4.

Office Action dated Jan. 21, 2021 in related foreign application No. JP 2018-531638, all pgs.

A Study on Numerical Computation of Pseudo TV-norm and its Application to Image Segmentation written by Kei Kawamura et al. and printed in IEICE Technical Report published by IEICE on Dec. 6, 2007 (vol. 107, No. 380, pp. 57-62).

Ting Chen et al., "Adaptive Spectral Unmixing for Histopathology Flourescent Images", 2013 IEEE 11th International Symposium on Biomedical Imaging (ISBI), United States, IEEE, Apr. 29, 2014, pp. 1287-1290.

Office Action dated Apr. 1, 2021 in related foreign application No. EP 16819508.9, all pgs.

* cited by examiner

SYSTEMS AND METHODS OF UNMIXING IMAGES WITH VARYING ACQUISITION PROPERTIES

RELATED APPLICATIONS

This patent application is a continuation of International Patent Application No. PCT/EP2016/081329, filed Dec. 16, 2016, which claims priority to and the benefit of U.S. Provisional Application No. 62/269,767, filed Dec. 18, 2015. Each of the above patent applications is incorporated herein by reference as if set forth in its entirety.

TECHNICAL FIELD

The present disclosure relates to systems and methods for unmixing that adjust reference vectors to local focus quality and other imaging characteristics.

BACKGROUND

In the analysis of biological specimens, such as tissue sections, blood, cell cultures, and the like, biological specimens (or assays) are stained and subsequently scanned or photographed for analysis. A staining assay conjugates one or more biomarkers, for example antibodies that bind to protein, protein fragments, or other targets in the specimen, with a respective stain, such that the presence of one or more biomarkers can be observed by the presence of the one or more stains. A stain can be a chromogen that can be observed in brightfield microscopy imaging, or a fluorophore that can be observed in fluorescence microscopy imaging. The stains create signals in an image that is input for visual assessment, documentation, or quantitative analysis. Observing the signals generated from the scan enables a variety of processes, including diagnosis of disease, assessment of response to treatment, and development of new drugs to fight disease.

Upon scanning the stained specimen, multiple channels of image data, often referred to as color channels are captured with a camera. Typically, each color channel captures a part of the signal from all stains, i.e. the signals are mixed in the acquired color channels. For example, a pure red, green, and blue color components are a typical example of color channels, however, the color channels may in theory be any linearly independent set of vectors in the color space. In order to unmix the captured color channels into new "stain channels", in which the signals are proportional to the strength of the stains, a color deconvolution or unmixing is usually performed. This step of color unmixing is highly dependent on reference vectors that identify the color composition of the stain in the nominal color channels of the image (i.e. a red, green, and blue component). To get stain channels which are accurately representative of the stains present, each stain and/or each level of strength of stain requires its own reference vector. For example, to get a stain channel in which the signal strength represents the density of a brown stain, an appropriate reference vector with a red, a blue and a green component corresponding to a brown must be included in the unmixing computation. In a more complete example, biological images with white, blue and brown components can be unmixed into three stain channels: one in which the red components are bright, one in which the black components are bright, and one in which the blue components are bright.

Generally, color separation (also referred to as color unmixing, spectral unmixing, or color deconvolution) is used to determine a concentration of specific stains and, therefore, biomarkers within an observed channel or channels of assay. Each pixel of a scanned image is represented by a vector of image values, or a color vector, and each stain corresponds to a reference vector, or spectrum of reference vectors, also known as a reference spectrum. In general, the image value vector for every pixel of an acquired image is a weighted sum or other combination of the reference vectors for the stains of biomarkers presented at this location. The goal of signal unmixing is to determine the local amount of a stain, which enables a quantitative analysis of the biomarker presence in the specimen. Techniques for such stain unmixing are known, for example, as described by Ruifrok, A. C., & Johnston, D. A. (2001). "Quantification of histochemical staining by color deconvolution." Analytical and quantitative cytology and histology/the International Academy of Cytology [and] American Society of Cytology, 23(4), 291-299. These techniques might use matrix factorization or non-negative matrix factorization, with a matrix formed from the reference vectors and the image as inputs.

Similar unmixing technology is also known from other applications, for example aerial photography, satellite imagery, and the like. In all applications, the goal is to determine the local amount of signal sources for which reference vectors are known. It is widely recognized that all these unmixing techniques critically depend on correct reference vectors, i.e. precise knowledge of the image value vector generated for the pure presence of only one stain. However, in many applications, reference vectors are not precisely known because they can vary from image to image and between different regions in an image. Therefore, methods have been proposed to adjust reference vectors base on acquired data. Such methods can be either "blind", i.e. work with image data alone (for example, Gavrilovic, M., Azar, J. C., Lindblad, J., Wahlby, C., Bengtsson, E., Busch, C., & Carlbom, I. B. (2013). "Blind color decomposition of histological images", IEEE Transactions on Medical Imaging, 32(6) 983-994.), or determine reference vectors using image data and additional external information that describes the currently imaged specimen and the staining process (for example Bredno, J., Dietz, L., and Martin, J. F. (2014). "Image adaptive physiologically plausible color separation", WIPO Patent Application WO/2014/195193).

As an example, U.S. Pat. No. 8,948,488 of Can et al. teaches methods and systems for digitally enhancing an initial image of a material to which a plurality of stains were previously applied, that generally comprise unmixing the image into a plurality of individual reconstructed images, each individual image corresponding to one of the stains; estimating a residual image corresponding to the difference between the original image and the reconstructed images; adjusting one or more components of the individual images; mixing the adjusted components using one or more estimated mixing coefficients; and adding the residual image to the mixed adjusted components to generate an enhanced image.

As another example, WO2013071003 of Czar et al. teaches a method that generates a color decomposition of histological tissue image data into density maps, where each density map corresponds to the portion of the original image data that contains one stain/tissue combination.

As another example, EP1636752 of Rabinovich features methods and systems where colors in an image (200) are unmixed (202) using a matrix X=AS, where A is an $n_s \times n_d$ matrix of spectral definitions, where s is the number of spectral components and d is the number of dyes into which the image is decomposed, and where S is a $n_s \times I$ matrix of amounts of each dye at every pixel, where I is the number of pixels; the matrix X is constrained for solution by an unsupervised matrix decomposition method having constraints consistent with properties of an additive color model; and $n_d$ is determined. A texture is determined to identify areas of interest. Further processing may automatically measure cell dye concentration in the determined regions of interest.

In yet another example, U.S. Pat. No. 8,781,250 of Zitnick et al. features techniques for image deconvolution to deblur an image given a blur kernel. Localized color statistics derived from the image to be deblurred serve as a prior constraint during deconvolution. A pixel's color is formulated as a linear combination of the two most prevalent colors within a neighborhood of the pixel. The linear combinations of the pixels serve as a two-color prior for deconvolving the blurred image. The two-color prior is responsive to the content of the image and it may decouple edge sharpness from edge strength.

In a further example, CN104200428 teaches microscopic image color convolution removal method based on the NMF directed at a tissue microscopic image after dye marking, and uses an NMF method to separate observation channels corresponding to different coloring agents.

In yet a further example, Jenzri describes a method for adapting the stain reference vectors (i.e. endmembers) to different regions or contexts of the "spectral space", and not the "image". The "spectral space" is the 3D space of all colors present in the image, in which the different regions of this space are usually not closely correlated to different regions of the image (Jenzri, H., Frigui, H., & Gader, P. (2014). "Robust context dependent spectral unmixing". In 22nd International Conference on Pattern Recognition (ICPR) pp. 643-647).

While methods exist to find the best overall reference vectors for an unmixing problem of an image, the problem of incorrect reference vectors still persists if reference vectors change within an image. This is an acknowledged problem in the art. The presence of a single or the presence of a mixture of stains can vary depending on properties of the imaged specimen or the imaging process. For example, in brightfield microscopy imaging, the hue of stained areas can change depending on whether stained objects are well in focus or not. In order to correctly unmix an image, this visible change in hue requires a corresponding change in reference vectors. There are many other examples where properties in the imaging process (for example, the focusing of imaged tissue in microscopy or the saturation of the surrounding counterstain) affect imaged signals. In order to correctly unmix such images, reference vectors need to be adjusted in accordance with properties of the imaging process. These properties of the imaging process can even vary within an image.

The present disclosure features systems and methods for the adjustment of reference vectors to imaging focus for brightfield microscopy, and more generally, for the adjustment of any reference vectors for all imaging applications where local variations in the imaging process result in a change in the image value vectors that need to be reflected by changes to reference vectors.

Any feature or combination of features described herein are included within the scope of the present disclosure provided that the features included in any such combination are not mutually inconsistent as will be apparent from the context, this specification, and the knowledge of one of ordinary skill in the art. Additional advantages and aspects of the present disclosure are apparent in the following detailed description and claims.

SUMMARY

One of the objectives of the present disclosure is to provide for an improved method, computer program product and system for determining reference vectors based on information specific to local properties of an image and an imaging process, as specified in the independent claims. Embodiments of the disclosure are given in the dependent claims. Embodiments of the present disclosure can be freely combined with each other if they are not mutually exclusive.

In one embodiment, the subject disclosure features systems and methods for enabling unmixing of multichannel image data in the presence of locally varying image characteristics, by utilizing the following steps:

creating a multitude of feature images from a multi-channel input image, where the feature images may be varying types of filter or mathematical processing applied to the original image, including but not limited to edge detection filters, blurring filters, high or low pass filters, and the like. The feature images form a feature vector for each pixel in the input image;

classifying each of these feature vectors based on the local imaging characteristics, and identifying regions in the input image that share imaging characteristics;

unmixing each of the areas separately using reference vectors that were obtained from regions in example images that have the same imaging characteristics, resulting in a set of unmixed stain channel images for each region; and combining the multitude of unmixing results from each of the separately unmixed regions to form a set of final unmixing result images for each stain channel.

In contrast to the prior arts, which assume that reference vectors are a function of the color vector space rather than the image pixel coordinates, one of the inventive technical features of the present disclosure is the separation of the image into local regions (or areas) based on local image characteristics, and selects reference vectors separately for each local region for use in unmixing of the region. Local image characteristics can mean characteristics that are a function of the image pixel coordinates. Without wishing to limit the disclosure to any theory or mechanism, this is advantageous because the disclosure is able to produce consistent results even if the input images are of varying quality and image properties between and within images. As a non-limiting example, if the images are being used to find FOVs and calculate cell counts, the unmixed images generated by the present disclosure can correct for varying focus quality in the original image.

According to one embodiment, the present disclosure features a medical image analysis method of unmixing color channels from a multi-channel image of a biological tissue sample stained with a plurality of stains. The method may comprise:

obtaining the multi-channel image comprising the plurality of stains, wherein a strength or intensity of the color channel of each stain varies depending on a local focus quality;

classifying the multi-channel image into a plurality of regions based on the local focus quality;

splitting the multi-channel image into a plurality of region images corresponding to the regions;

for each region image, determining a plurality of reference vectors corresponding to the color channels for that local focus quality, wherein each reference vector comprises a red, a green, and a blue color component associated with each color channel;

unmixing each region image using the reference vectors determined for the region image, wherein unmixing each region image results in a plurality of individual stain channel images; and combining the individual stain channel images of the region image into a combined stain channel image for each stain channel, thereby producing a plurality of combined stain channel images.

According to another embodiment, the present disclosure also features a medical image analysis system for unmixing color channels from a multi-channel image of a biological tissue sample stained with a plurality of stains. The system may comprise an image acquisition and storage system, a processor operatively coupled to the image acquisition and storage system, and a memory operatively coupled to the processor. The memory is configured to store digitally-encoded instructions that, when executed by the processor, cause the processor to perform operations comprising:

obtaining, from the image acquisition and storage system, the multi-channel image comprising the plurality of stains, wherein a strength or intensity of the color channel of each stain varies depending on a local focus quality;

classifying the multi-channel image into a plurality of regions based on the local focus quality;

splitting the multi-channel image into a plurality of region images corresponding to the regions;

for each region image, determining a plurality of reference vectors corresponding to the color channels for that local focus quality, wherein each reference vector comprises a red, a green, and a blue color component associated with each color channel;

unmixing each region image using the reference vectors determined for the region image, wherein unmixing each region image results in a plurality of individual stain channel images; and combining the individual stain channel images of the region image into a combined stain channel image for each stain channel, thereby producing a plurality of combined stain channel images.

In one embodiment, the plurality of region images may comprise a first region image comprising pixels that are classified as in focus and a second region image comprising pixels that are classified as out of focus. The focus quality may be determined by computing a metric for each image pixel, wherein a threshold or a set of thresholds is applied to the metric. In some embodiments, the step of computing the metric may comprise creating a single channel image from the multi-channel image, filtering the single channel image with a Laplacian-of-Gaussian filter, regulating the Laplacian-of-Gaussian filter with a median filter, thereby resulting in a filtered image, classifying pixels of the multi-channel image whose value in the filtered image is below a threshold to an out of focus class, classifying pixels of the multi-channel image whose value in the filtered image is above a threshold to an in focus class, and reclassifying any pixel within an adjustable radius of any in focus pixel to the in focus class.

In yet another embodiment, the present disclosure discloses a method of unmixing color channels from a multi-channel image. The method may comprise:

obtaining the multi-channel image comprising a plurality of color channels mixed together;

classifying the multi-channel image into a plurality of regions;

splitting the multi-channel image into a plurality of region images corresponding to the regions;

for each region image, determining a plurality of reference vectors corresponding to color channels of the multi-channel image, wherein each reference vector comprises a plurality of color components associated with each color channel;

unmixing each region image using the reference vectors determined for the region image, wherein unmixing each region image results in a plurality of individual stain channel images; and combining the individual stain channel images of the region image into a combined stain channel image for each stain channel, thereby producing a plurality of combined stain channel images.

In still another embodiment, the present disclosure also discloses a system for unmixing color channels from a multi-channel image. The system may comprise an image acquisition and storage system, a processor operatively coupled to the image acquisition and storage system, and a memory operatively coupled to the processor, configured to store digitally-encoded instructions that, when executed by the processor, cause the processor to perform operations comprising:

obtaining, from the image acquisition and storage system, the multi-channel image comprising a plurality of color channels mixed together;

classifying the multi-channel image into a plurality of regions;

splitting the multi-channel image into a plurality of region images corresponding to the regions;

for each region image, determining a plurality of reference vectors corresponding to color channels of the multi-channel image, wherein each reference vector comprises a plurality of color components associated with each color channel;

unmixing each region image using the reference vectors determined for the region image, wherein unmixing each region image results in a plurality of individual stain channel images; and combining the individual stain channel images of the region image into a combined stain channel image for each stain channel, thereby producing a plurality of combined stain channel images.

In some embodiments, the step of classifying the multi-channel image further comprises generating a plurality of feature images from the multi-channel image, wherein the feature images may be filtered or processed versions of the original image such as edge detection, blurring, sharpening filters or the like; generating a plurality of feature vectors, wherein each feature vector comprises a plurality of pixels formed by selecting a pixel at a same location in each feature image and assembling them into an array; classifying the pixel according to the feature vector using a supervised or unsupervised classification algorithm; and applying a regularization filter such that pixels in close vicinity are assigned to the same class, thereby dividing the multi-channel image into regions corresponding to the assigned classes of the pixels.

According to one embodiment, a supervised classification process is utilized to classify the pixel. The supervised classification process may comprise reading a set of annotated example images, wherein individual pixels are annotated as examples of pure stains, wherein the annotation comprises a known classification for that pixel; generating a plurality of feature images for each example image; generating a feature vector for each annotated pixel, wherein the feature vector comprises the plurality of pixels formed by selecting the pixel at the same location in each feature image; combining the feature vectors with the known classifications from the annotation to produce a set of classification data; training a supervised learning algorithm using the classification data to predict the classifications of the training data given the feature vectors of the training data; and applying the trained supervised classification algorithm to the feature vector of each pixel in the multi-channel image to produce a classification for each pixel in the image.

According to alternate embodiment, a non-supervised classification process is utilized to classify the pixel. The non-supervised classification process may comprise applying a clustering mapping process to the feature vectors of all pixels in the feature image to generate a cluster map of the multi-channel image. Each class represents a region of the cluster map of the image, and all pixels within the same region of the cluster map are assigned to the corresponding class.

Another unique and inventive technical feature of the present disclosure is the combination of steps and, in some embodiments, the sequence in which they are performed. For example, the method features the following combination of steps performed in the following sequence: 1. Classifying the multi-channel image into a plurality of regions based on a specific metric or characteristic, such as local focus quality, local stain intensity, and local tissue thickness; 2. Splitting the multi-channel image into a plurality of region images corresponding to the regions; 3. For each region image, determining a plurality of reference vectors corresponding to color channels of the multi-channel image, wherein each reference vector comprises a plurality of color components associated with each color channel; 4. Unmixing each region image using the reference vectors determined for the region image, wherein unmixing each region image results in a plurality of individual stain channel images; and 5. Combining the individual stain channel images of the region image into a combined stain channel image for each stain channel, thereby producing a plurality of combined stain channel images. Without wishing to limit the disclosure to any theory or mechanism, it is believed that the technical features of the present disclosure advantageously provide for the ability to get consistent results out of the unmixing, even if the inputs are of inconsistent quality. None of the presently known prior references or work has the unique inventive technical feature of the present disclosure.

To create a system that uses this disclosure, example images are collected, and regions or objects that show only one stain are used to determine reference vectors for stains. Supervised or unsupervised machine learning is used to determine a set of imaging characteristics classes, and the example images constitute training data to determine the local imaging characteristics on an input image. All of these steps are described in greater detail in the following section.

The present disclosure has been described, for exemplary purposes, in connection with unmixing color channels from a multi-channel image of a biological tissue sample stained with a plurality of stains and for brightfield microscopy images of a biological specimen. The adjustment of reference vectors for brightfield microscopy imaging depending on the local focus quality is used as an example in the detailed description. However, the present disclosure is applicable to any imaging application.

Definitions

A pixel can refer to the smallest indivisible element of the image. Pixels can be grouped into super-pixels, which include multiple contiguous pixels. The grouping usually depends on the local characteristics of the image, such as color, brightness, etc. As used herein, the term "pixel" is defined to include both meanings of "pixel", which is the smallest indivisible element of the image, and "super-pixels", which are grouped pixels, including multiple contiguous pixels.

The term "color channel" refers to one of the decomposed color components of the image. As a non-limiting example, in an RGB camera, which is typical of most consumer cameras, there are three such images or channels, corresponding to the red, green, and blue color components of the image.

The term "stain channel" refers to the region in the color space corresponding to one of the stains applied to a tissue sample assay. The stain channel image for a stain channel can be generated by the color unmixing or color deconvolution computation, which uses the color channels and reference vectors as inputs.

The term "reference vector" refers to a plurality of numbers that represent the color components in RGB space of a color channel.

The term "feature vector" refers to a plurality of numbers that represent the gradients, color intensities, hues and other filter outputs centered on a pixel in the image.

The term "local image characteristics" is defined as characteristics that are a function of the image pixel coordinates.

A "regularization filter" is a filter that assigns to a set of contiguous pixels the same value(s) derived from another filter or set of filters, depending on some rule, such as majority rule.

A threshold as used herein refers to a numeric value. A non-limiting example of a threshold is the value 128 for a color that can vary from 0 to 255. A non-limiting example of a set of thresholds is [0.3, 0.5] for a gradient that can vary from 0 to 1.0.

BRIEF DESCRIPTION OF THE DRAWINGS

The features and advantages of the present disclosure will become apparent from a consideration of the following detailed description presented in connection with the accompanying drawings in which.

DETAILED DESCRIPTION

The disclosure is applicable for unmixing of any multi-channel image data. Examples include brightfield microscopy slides of stained specimens, fluorescence microscopy slides of stained specimens, aerial photograph, and satellite imagery. The disclosure is described using the adjustment of reference vectors to the local image focus in brightfield microscopy, and it is further described how this principle can be extended to all image unmixing problems where reference vectors change with imaging conditions.

Figure 1A:
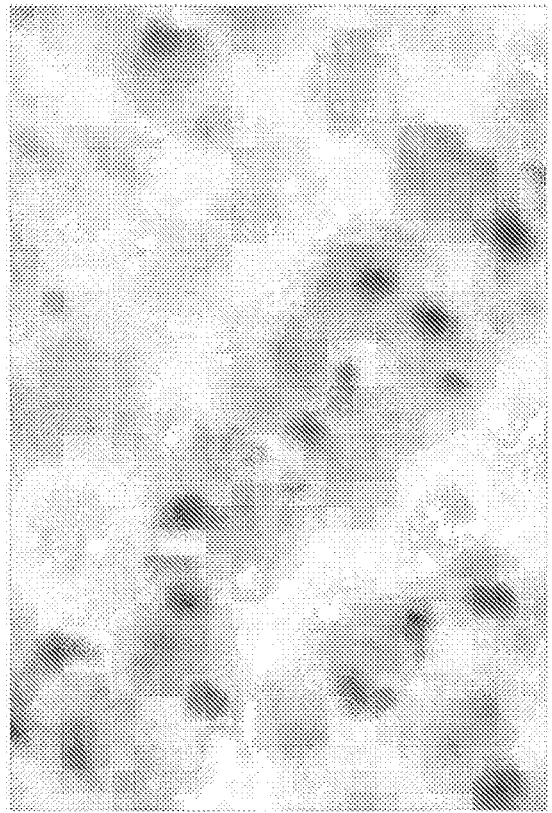
FIGS. 1A and 1B show an FOV from a breast cancer specimen stained with an assay to identify the number of gene copies for two different genes. The breast cancer tissue is stained with hematoxylin (blue cell nuclei) visible as elliptical objects, and DNA probes stained with a black and a red chromogen, respectively. DNA probes are visible as small stained blobs. The DNA probe for the red chromogen identifies the presence of chromosome 17, and the DNA for the black chromogen identifies the presence of a gene copy for the HER-2 protein. The same area of tissue and field of view was imaged with the tissue well in focus (FIG. 1A) and with most of the tissue not in focus (FIG. 1B).

An example image for the application of this disclosure is given in FIG. 1. A field of view (FOV) of breast cancer tissue under the microscope is shown. Cell nuclei are stained with Hematoxylin and appear as blue, elliptical objects. In the assay staining this tissue, two further biomarkers are stained. Gene probes for the HER2 gene and for Chromosome 17 are stained with a black chromogen (silver) and a red chromogen, respectively, and appear as red and black dots inside the cell nuclei. Images similar to the one shown in FIG. 1A are quantified by determining the ratio of black dots to red dots in each nucleus, and the quantitative read-out from such a tissue slide influences the treatment decision for the cancer patient. Digital pathology algorithms are available that count the red and black dots in each nucleus to facilitate and standardize this quantitative assessment of the stained tissue. The biomarkers appear inside of the cell nucleus, such that the blue stain usually appears surrounding or even co-located with the other chromogens. Therefore, a typical automated algorithm involves stain unmixing, i.e. the automated determination of the amount of blue, red, and black stain for each pixel in a digital image.

Figure 1B:
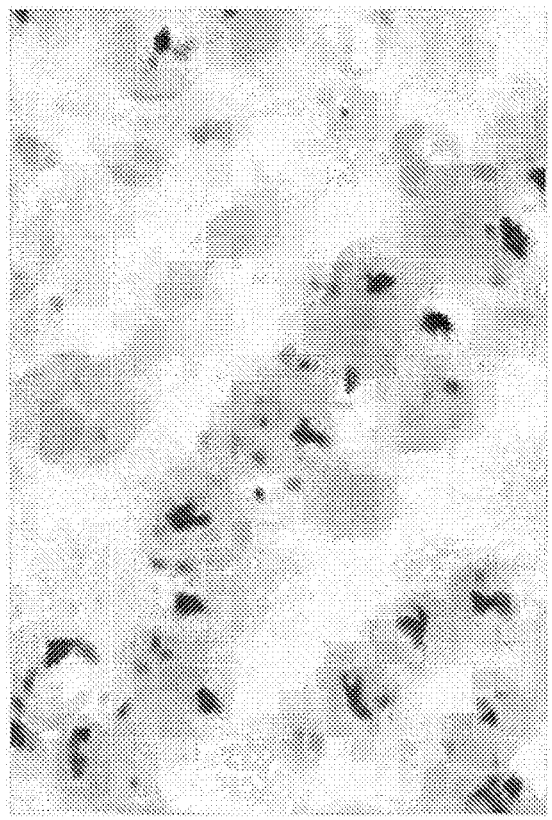

The same FOV is shown again in FIG. 1B. This time, the image is not well focused, such that the biological objects become blurred. Such variations in image quality are known to appear when an assay and digitizing system are widely used by users with a variety of training in a variety of institutions. For a reliable patient therapy decision, it is desired that the analysis result of the image in FIG. 1B is the same as the analysis result of the image in FIG. 1A. This means that the final unmixing result for these two images must be very similar.

Figure 2B:
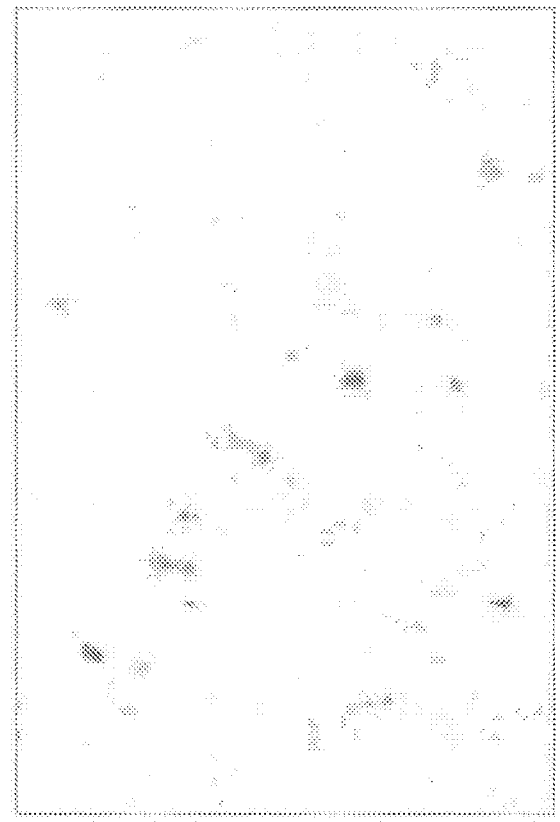
FIGS. 2A and 2B show unmixing result for the DNA probe stained with the red chromogen using known art for the FOV that is well in focus (FIG. 2B) and for an FOV that is not well in focus (FIG. 2B). A clear difference between the unmixing results is seen even though the same area of tissue was imaged. The goal of the disclosure presented here is to create similar unmixing results even if imaging characteristics like the focus of microscopy imaging changes.
Figure 2A:
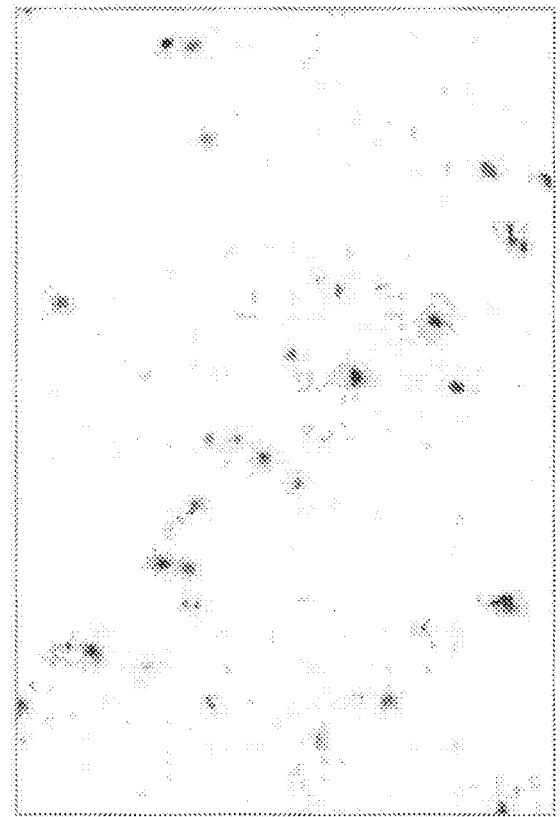

In the state of the art, reference vectors or reference colors for stain unmixing are typically collected from available image data during the development of an algorithm, and the obtained reference vectors for the different stains or colors are used for unmixing. The result of the state-of-the-art approach for the FOVs in FIG. 1 is shown in FIG. 2. For the image that is well in focus, the red chromogen and, therefore, the presence of the Chromosome 17 biomarker is clearly visible in FIG. 2A. However, when the same method is applied to the same FOV when imaged out of focus, the method no longer reliably detects the presence of the red chromogen (FIG. 2B). The detected signal is lower, and some of the stained dots are missing, which is especially critical in imaging applications that require a reliable count of such dots.

Figure 3:
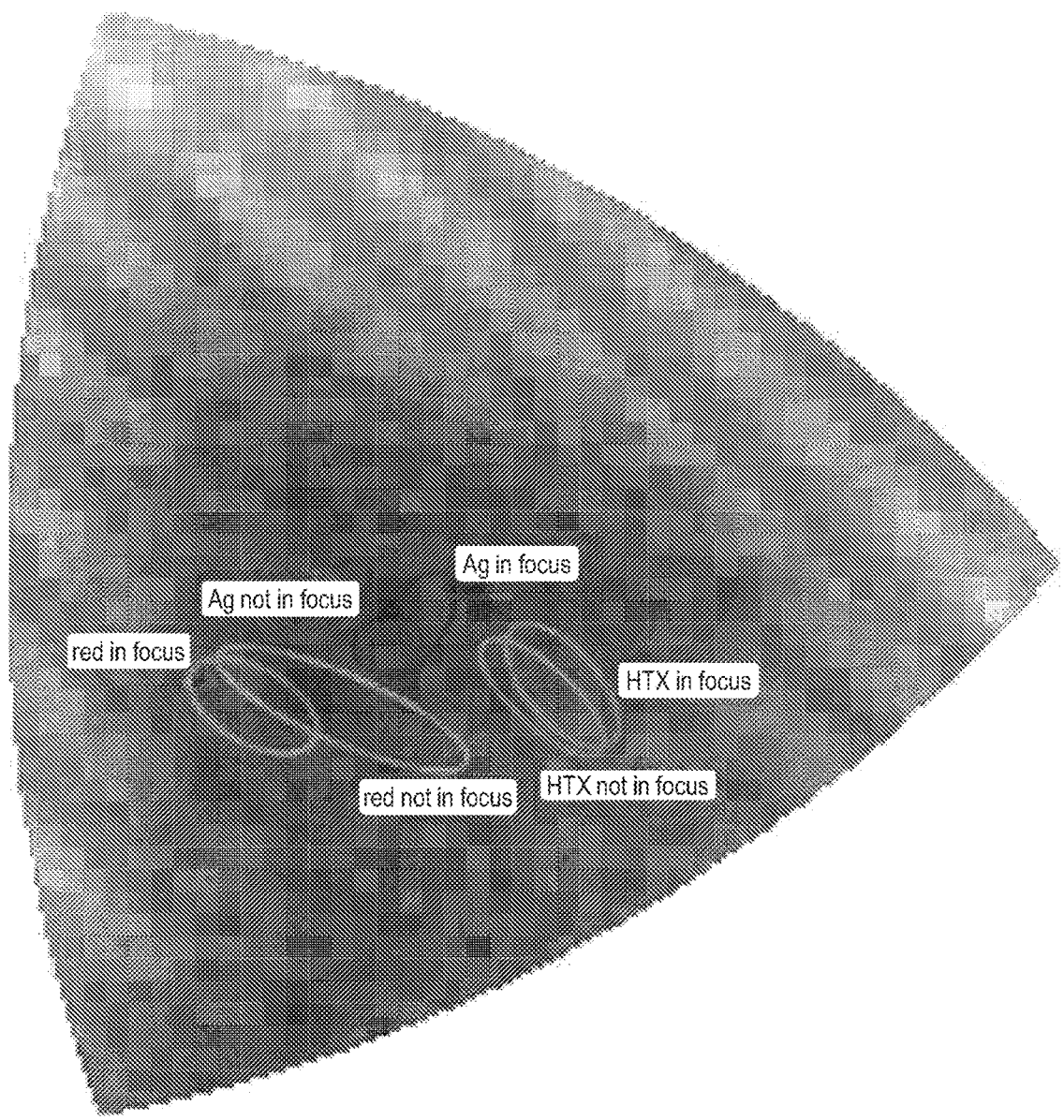
FIG. 3 shows reference vectors for three stains red, black (Ag) and blue (HTX) collected on FOVs that are well in focus and on FOVs that were not well in focus. For color unmixing, the hue and brightness of a stain defines its reference vectors, and different hue and brightness combinations are derived from different stains in this tissue. It is shown that especially for the red chromogen, the hue and brightness and, therefore, the reference vector needed for unmixing depends on whether the tissue is either well in focus or not well in focus.
Figure 4:
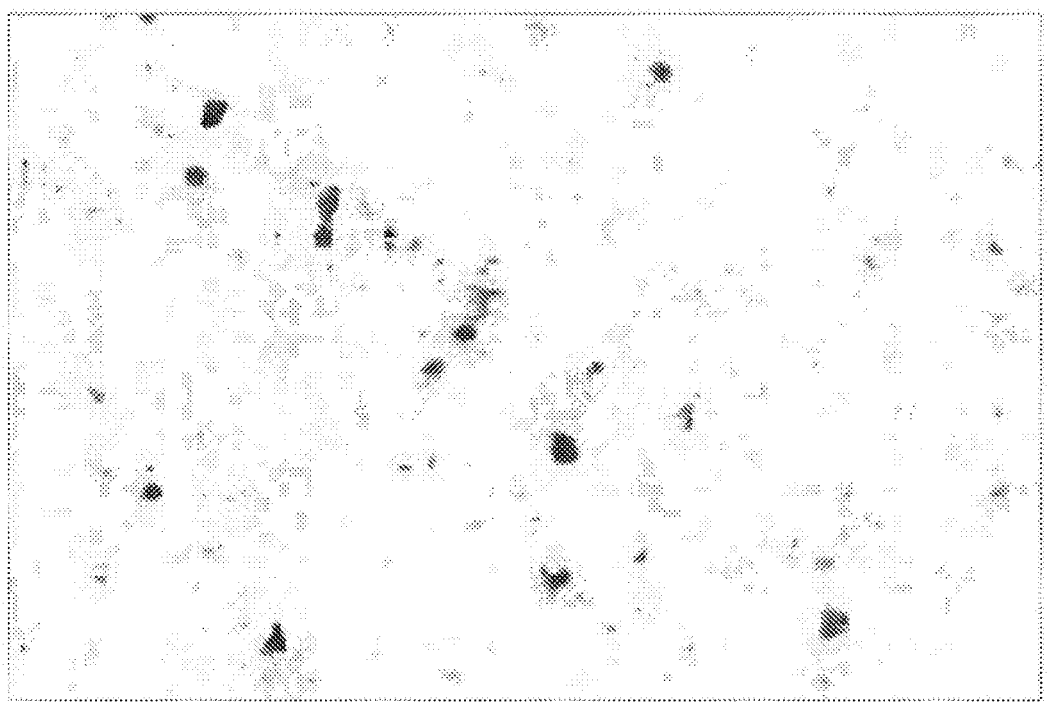
FIG. 4 shows unmixing result for the FOV that is not well in focus when the reference vectors were determined from images that were also not well in focus. This image shows that results can be similar to those obtained from FOVs that are well in focus if the reference vectors are adjusted to imaging characteristics before the unmixing takes place.

The change of the reference vectors for the stains has been identified as one reason for the inability of a standard unmixing method to deal with out-of-focus images and other variabilities introduced by an imaging process. To visualize this effect, the reference colors have been collected from FOVs imaged well in focus and not in focus. FIG. 3 shows reference colors on a color chart. Different positions on this color chart represent different hues of a stain and, therefore, different reference vectors for unmixing. The chart shows that the chromogens in the presented FOVs have different reference vectors when the same tissue is imaged well in focus or not well in focus. The change in reference vectors with imaging properties shown in FIG. 3 has been identified as the main reason for unreliable unmixing results as shown in FIG. 2, right. Further evidence for this is given in FIG. 4. When the FOV that is not in focus (FIG. 1B) is unmixed with reference vectors that were obtained from image data that is not in focus, then the new unmixing result (FIG. 4) clearly shows the dots that were either missing or only unmixed with weak signal in FIG. 2B.

Based on these observations, it is beneficial in an unmixing process if reference vectors are adjusted to properties of the actual image, instead of the properties that were expected. This new method for unmixing first determines properties of the imaging process. These properties can be determined for a complete image (for example, a wholeslide image of tissue), a part of this image (for example, a FOV from such wholeslide image) or to areas in an image of any shape. It is known in the art to adjust reference vectors for unmixing to the image data at hand (Gavrilovic, M., Azar, J. C., Lindblad, J., Wahlby, C., Bengtsson, E., Busch, C., & Carboni, I. B. (2013L "Blind color decomposition of histological images. Medical Imaging", IEEE Transactions on, 32(6) 983-994.), or Bredno, J., Dietz, L., and Martin, J. F. (2014) "Image adaptive physiologically plausible color separation", WIPO Patent Application WO/2014/195193). For example, in these methods, the adjustment determines the most suitable reference vector for each stain in the image, and these reference vectors are applied to unmix each image in its totality.

However, methods known in the art do not handle cases well in which imaging properties or characteristics vary within an image. Such variations occur frequently in image data that is acquired in a scanning process, such as wholeslide imaging of microscopy slides or the acquisition of remote sensing or satellite imagery. In such scanning processes, the acquired image is composed of data that is obtained by sequentially imaging smaller subareas, such that changes in image properties frequently occur in the final image data. Furthermore, for imaging using optics, the focus, illumination, and other properties are known to vary within one field of view even if this field of view is acquired in a single acquisition.

The disclosure is first presented with an embodiment that adjusts reference vectors for stain unmixing to the focus quality of image regions in brightfield microscopy. The disclosure is then presented for the more general application of adjusting reference vectors for unmixing to the local properties of an imaging process.

In order to adjust reference vectors depending on areas of an image being well in focus or not, it is necessary to determine a metric that can indicate whether an area of an image is in focus. Many different metrics for this are known in the art, with one example being creating a single-channel image from the incoming color image, for example, as a sum of optical densities in each channel, or the average of the color channels of the input image; filtering this single-channel image with a Laplacian-of-Gaussian filter on a small scale, for example, with a filter template [ 0 1 0; 1 −4 1; 0 1 0] and taking the absolute filter response; and regulating the filter result, which is typically noisy, with a median filter, for example, of the size 3×3 pixels.

This method determines the local presence of object edges, which is a surrogate measure for focus metric. However, even an area in an image that is well in focus does not show edges everywhere, with objects like stained dots, cell nuclei, etc. showing little edge information inside of an object. Areas in the vicinity of a strong edge are considered to be well in focus even if no strong edge information is present. Being in the vicinity of a strong image signal is captured with the last filtering step, in which a grey-level morphological opening operation with a disk-shaped structuring element is applied on the filter result image. In other words, assigning all pixels within a circular radius around any strong edge pixel to the in focus region. The size of the structuring element (i.e. radius) can be adjusted to match the size of expected relevant objects in the image (for example, cell nuclei or stained dots).

Figures 5A, 5B:
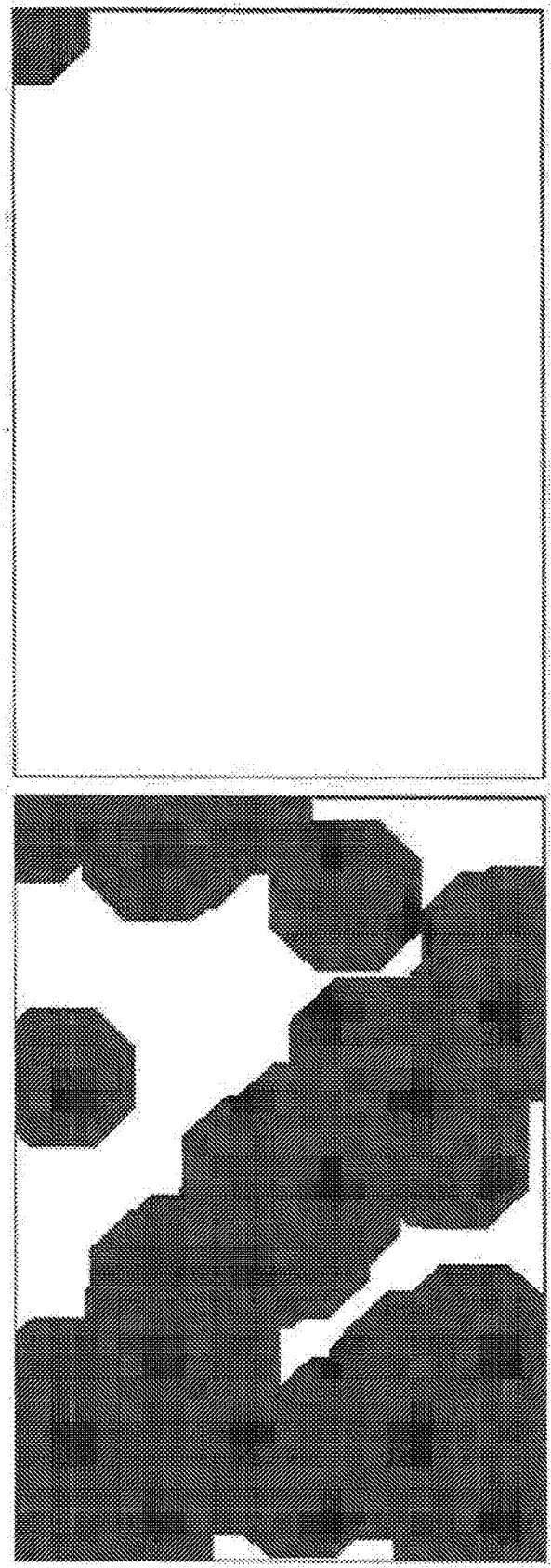
FIGS. 5A and 5B show an example of determining local image characteristics. Areas in the FOV images that are identified as having objects that are well in focus are shown in black. The result is presented for the example FOV that is well in focus (FIG. 5A) and for the example FOV that is not well in focus (FIG. 5B). The method described above is able to determine the presence of objects that are well in focus.

A threshold can be applied to this image of local focus metric to distinguish areas being well in focus and areas that are not well in focus. The result of this operation is shown in FIG. 5 for the FOV image that is well in focus (FIG. 5A) and the FOV image that is not well in focus (FIG. 5B). Areas identified as being well in focus are indicated in black. The present method typically classifies areas that do not contain any image content as not being well in focus, which has no negative impact on the final unmixing result. Nearly the entire image that is not well in focus is identified as not being in focus by this method (FIG. 5B).

Figure 6:
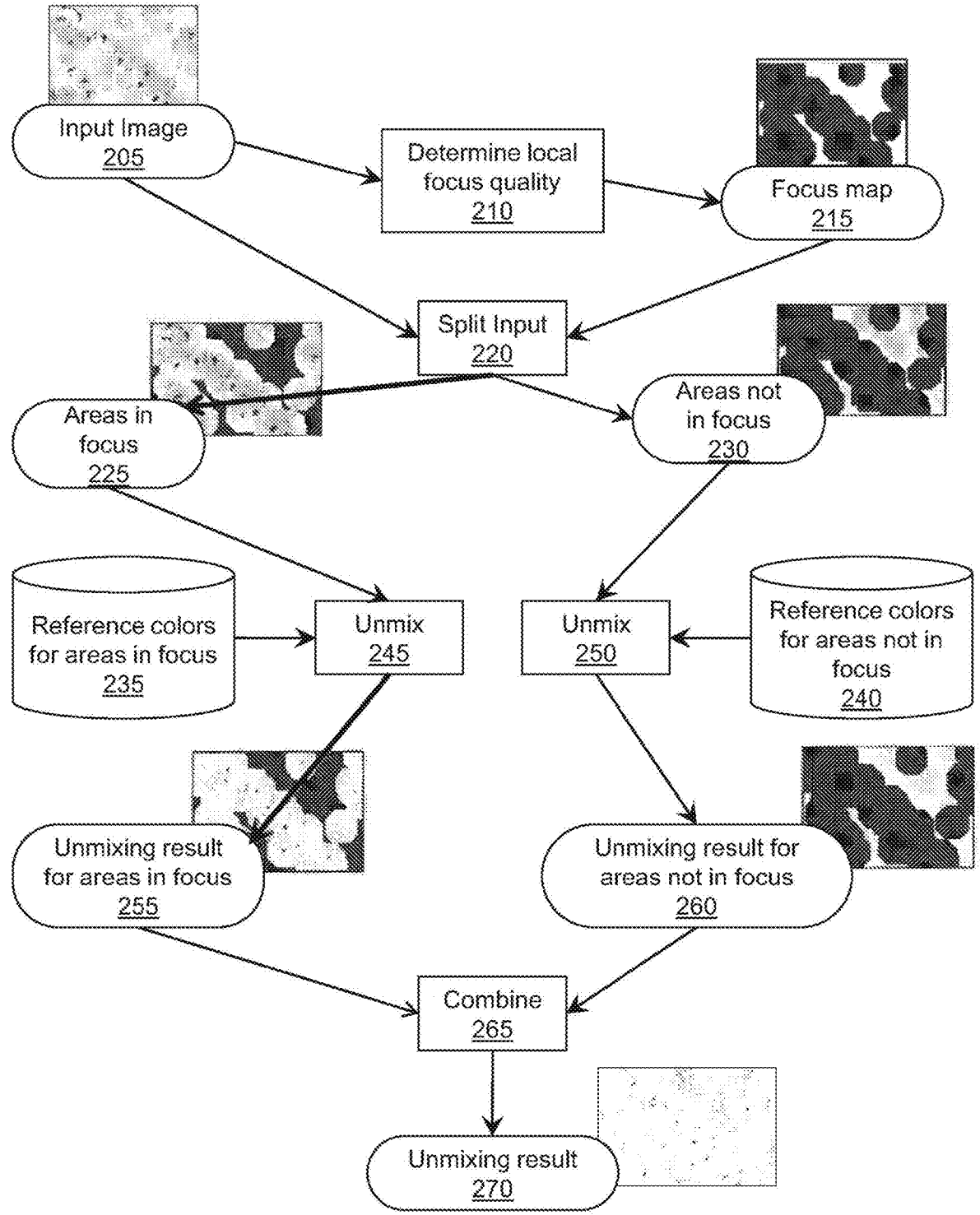
FIG. 6 shows an exemplary flow chart for an embodiment of the present disclosure that adjusts reference vectors for brightfield microscopy depending on the local focus.

With the ability to distinguish regions in an image based on their image characteristics, for example, the property of being well in focus, the new method for unmixing of brightfield microscopy image data is presented in the flowchart in FIG. 6. In order to unmix an input image 205, the method described above is applied to determine the local focus quality 210 and a focus map 215 is the result of this operation.

In this focus map, each pixel in the input image is identified as either being in a region that is well in focus, or in a region that is not well in focus. The input image 205 and the focus image 215 are inputted into a step 220 that splits the input image to generate two different input images. The image 225 contains areas of the input image 205 that are in focus, and the image 230 contains areas of the input image 205 that are not in focus. Now, a standard unmixing process is executed twice. The first unmixing step 245 receives the image having areas that are in focus 225 and unmixes the image with reference vectors that have been determined for areas in focus 235. The result of step 245 is an image with the unmixing results of areas that are in focus 255. Similarly, the second unmixing step 250 receives the image having areas that are not in focus 230 and unmixes the image with reference colors that were determined for image areas that are not in focus 240. The result of the second unmixing step 250 is an image with the unmixing result for the areas that are not in focus 260. The two individual unmixing results 255 and 266 are combined in step 265 to obtain the final unmixing results 270.

Figure 7A:
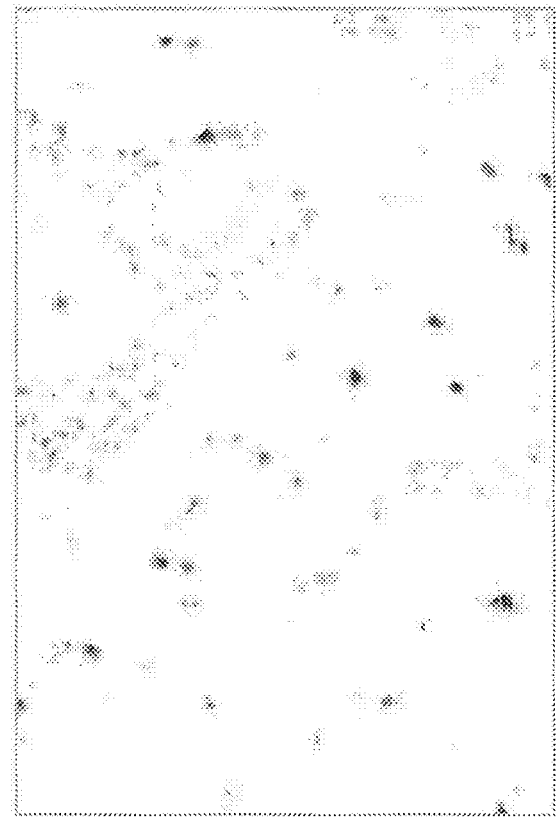
FIGS. 7A and 7B show unmixing results for the red chromogen using the proposed methods for the FOV that is well in focus (FIG. 7A) and the FOV that is not well in focus (FIG. 7B). In contrast to FIG. 2, the new method presented in FIG. 6 creates unmixing results that are similar even if the imaging characteristics change.
Figure 7B:

While FIG. 2 shows the unmixing result using a standard unmixing technique applied to FIG. 1, FIG. 7 shows the result of unmixing using the method presented in FIG. 6 and applied to FIG. 1. Both FIG. 2 and FIG. 7 show unmixing results for the same FOV being imaged once well in focus (FIG. 2A, FIG. 7A) and once not well in focus (FIG. 2B, FIG. 7B). In contrast to FIG. 2, the unmixing result images for the red channel in FIG. 7 show unmixing results with similar signal intensity, and all objects visible for the image in focus are now also visible for the image that was not well in focus.

The method presented in FIG. 6 can be generalized to adjust reference vectors for the unmixing of a wide variety of different image data to a wide variety of imaging properties. The general system is presented in FIG. 8. A multi-channel input image 305 is inputted into a feature image generation 310. A multitude of feature images can be created, all of which are well known in the art. Examples for feature images include lowpass filters, highpass filters, gradient filters, edge filters, ridge filters, and texture filters for each channel of the multi-channel input image 305. The feature image generation 310 further creates feature images that are computed across channels, for example, the hue of a color in a color image, the image channel with the strongest local signal, or the difference between two image channels. The feature images form a feature vector for each pixel in the input image, i.e. the same pixel in each of the feature images are put in an array to form the feature vector. Each of these feature vectors is inputted to the local area class determination 320. This classification is guided by classification data 325 that reflects the image data at hand and is further described below.

The result of classification 320 is the assignment of a class for each pixel in the image. These classes represent different image characteristics. In the system described in FIG. 6, two classes of image characteristics, namely being well in focus and not being well in focus are used. In the more general system shown in FIG. 8, a multitude of different classes are used. Examples for these classes in the field of tissue microscopy imaging include the focus of the image, the overall staining intensity, the thickness of the tissue under the microscope, and the intensity of illumination. In other imaging applications, these and/or other characteristics of the imaging process are used as classes. The result of the local area class determination 320 is a map with classified areas 330 of the image. In this map, every pixel in the input image 305 is assigned to one class. This class is determined by classifying the feature vector for each pixel from the feature images 315 with the classification data 325.

In addition to the individual, pixel-wise classification, a spatial regularization can be applied such that pixels that are in close spatial vicinity are assigned the same class of imaging properties. As known to one of ordinary skill in the art, an example of a method to spatially regularize a map image is a majority filter. The final class for each pixel is set to be the class that occurs in the majority of pixels in that pixel's neighborhood. A pixel's neighborhood is typically described as a set of pixels that are within a predefined distance of the pixel. The map image with classified areas 330 and the input image 305 are used to split the input image into a multitude of image areas 335. This split creates a multitude of image areas 350.1-350.$n$. Each one of these image areas contains only the pixels of input image 305 that have been classified as having the imaging characteristics of the class identified by the local class determination 320.

A set of reference vectors 355.1-355.$n$ is available. Each set of reference vectors captures the appearance of pure stains under the imaging characteristics of the respective class. For each class 'c' of imaging characteristics, the image areas 350.$c$ that were captured under these imaging characteristics are unmixed (360.$c$) with a set of reference vectors (355.$c$) that match these imaging characteristics. The result is a multitude of unmixing results 365.1-365.$n$, and for each of these unmixing results, the reference vectors used for unmixing match the imaging characteristics under which those image areas were acquired. All unmixing results 365.1-365.$n$ are combined in step 375 to form a final unmixing result image 380.

Figure 8:
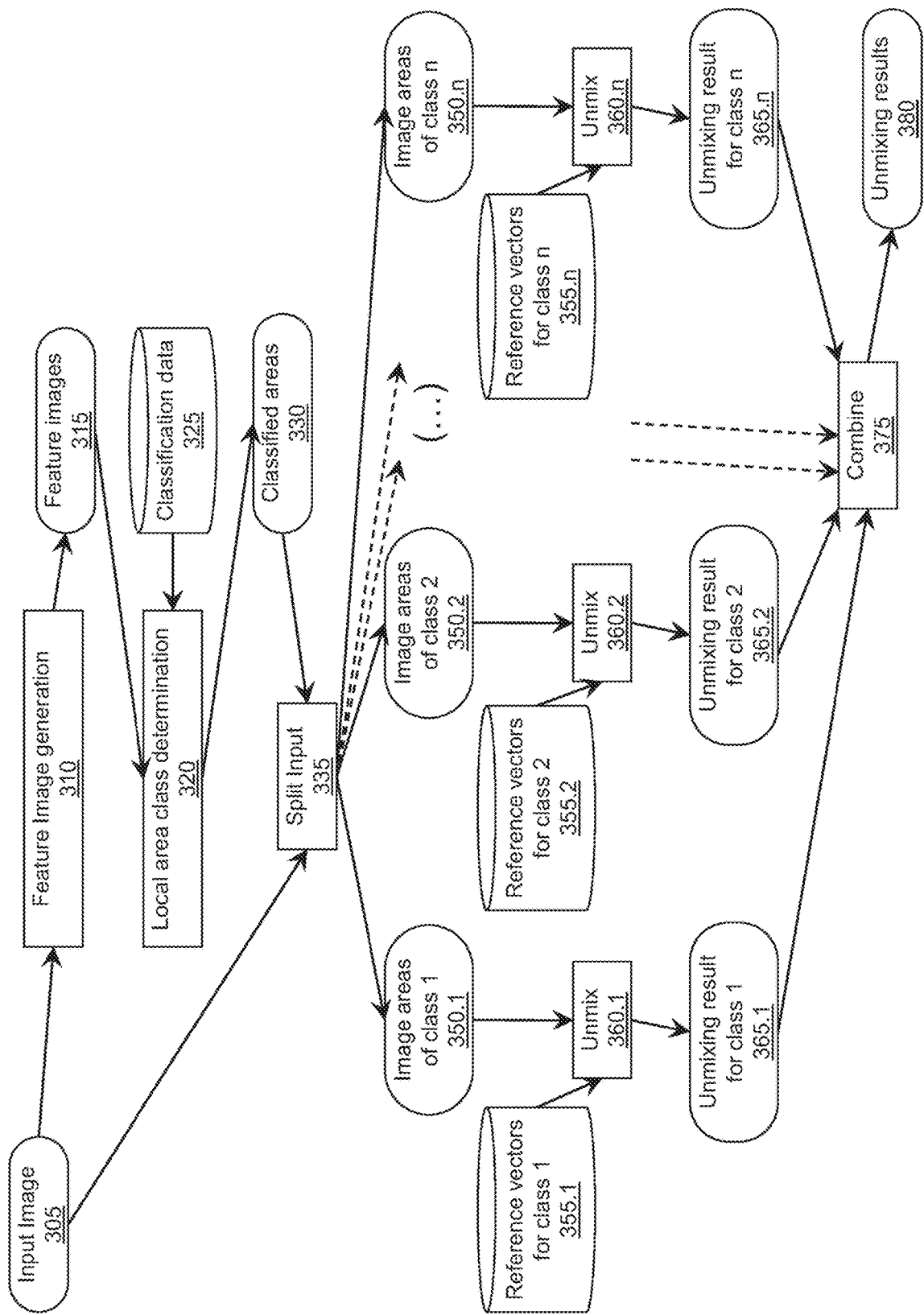
FIG. 8 shows an exemplary flow chart for an embodiment of the present disclosure that adjusts reference vectors for unmixing image data depending on local properties of the image and imaging process.

The application of the system presented in FIG. 8 requires classification data 325 and multiple sets of reference vectors 335.1-$n$. In many unmixing methods, reference vectors are determined beforehand from example image data. Reference vectors typically need adjustment for each source of image data and set of stains present in the imaged objects. On respective example image data, areas that exhibit only one stain are identified manually, and descriptive statistics, such as average or median, are used to determine a reference vector from manually identified regions with only one stain. In order to create a system according to FIG. 8, example images are collected that represent a wide variety of imaging characteristics, and areas that represent a pure stain are annotated on each of these images. These example images or training images are then inputted to the same feature image generation as used in step 310, and the feature images are used to create the classification data 325.

Two different approaches can be taken to generate classification data 325 from these feature images. In a non-supervised approach, the feature vectors collected for all individual pixels in the training images are inputted to a clustering process. Such clustering process automatically determines a number of clusters in the feature space. A cluster is defined as a set of feature vectors that are similar to each other while at the same time dissimilar to feature vectors from other clusters. A cluster is represented by descriptive statistics that determine a cluster center or prototype vector for the cluster, and the variation of feature vectors of all pixels belonging into this cluster. Methods to determine clusters are known in the art, with k-means clustering being one example that is well suited to determine classification data 325. Each cluster represents one of the classes to classify areas in an image.

In a supervised approach, the classes are defined a-priori when creating an application using the disclosed method. As an example, being in focus or not being in focus are a-priori defined classes. Depending on the imaging system and the image data, other characteristics can determine tissue thickness, overall staining intensity, and illumination characteristics for brightfield microscopy imaging of tissue, or other characteristics that describe other imaging applications. Combinations of these characteristics form classes, with examples being "thick tissue in focus", "thin tissue in focus", "thick tissue not in focus", etc. To create the classification data 325 with a supervised approach, regions in the example images that belong to these classes are annotated, and a supervised learning scheme for a classifier is used. Many classifiers and learning schemes are known in the art. Examples include random forest classifiers, support-vector-machine classifiers and artificial neural networks. These and many other classifiers are suitable to create classification data 325 for the classification step 320.

Figure 9:
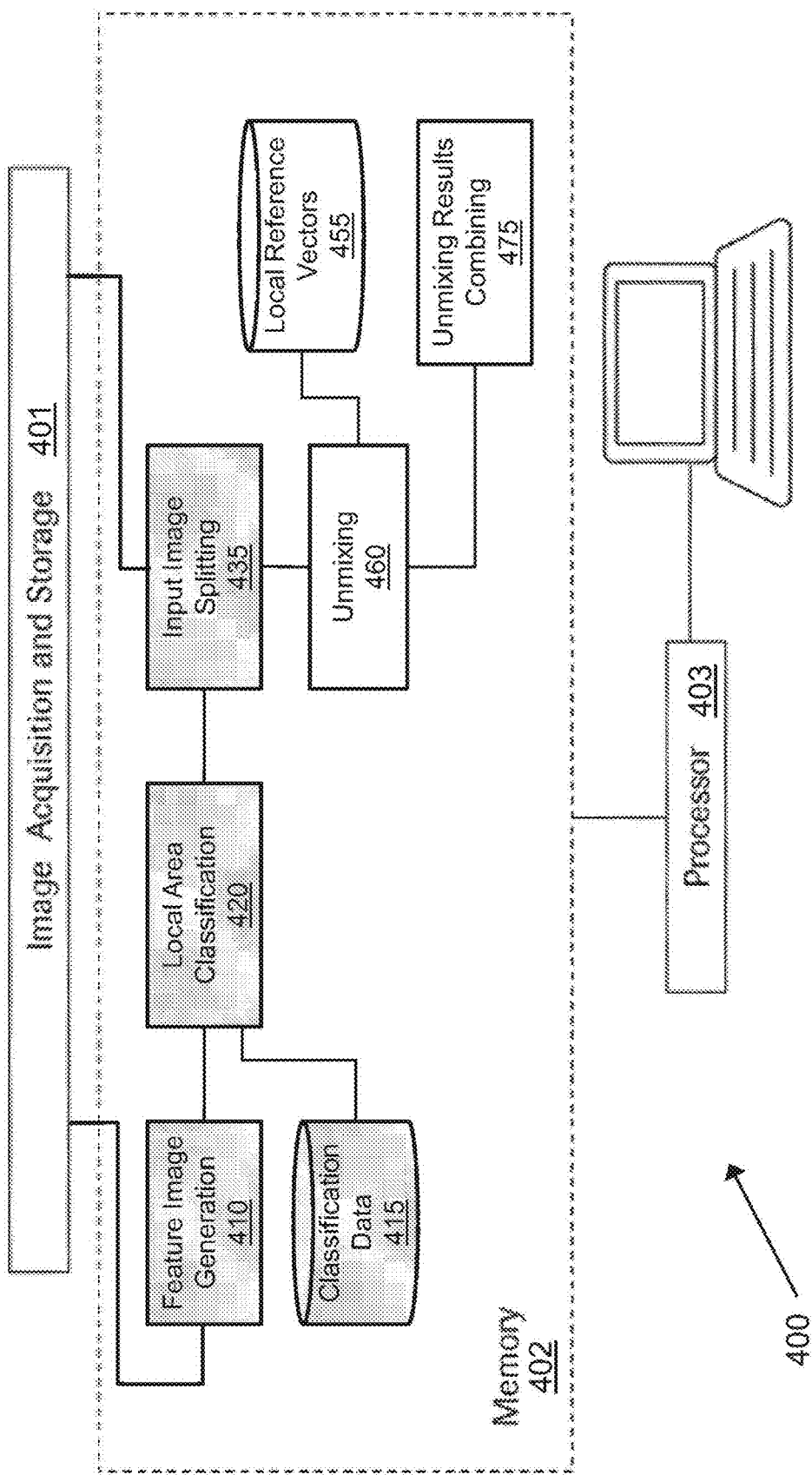
FIG. 9 shows an exemplary schematic diagram of the embodiment in accordance with FIG. 8.

FIG. 9 shows a diagram of the system of the present disclosure (400). The system comprises an image acquisition system (401), processor (403), and memory (402). The memory (402), is a computer readable media upon which is stored instructions that when executed cause the processor (403) to perform operations comprising the disclosure. First, a multi-channel image is acquired from the image acquisition system (401). A plurality of feature images (410) are generated from the image. From the plurality of feature images, a plurality of feature vectors, one for each pixel in the original image, are generated. The feature vectors comprise an array of pixels from each feature image. The feature vectors, along with classification data (415) are used to classify the pixels in the multi-channel image into local area classes (420). The image is then split into region images (435), in which all pixels not in the region are set to zero, i.e. black. At this point, the separate region images are unmixed (460) according to reference vectors that are adjusted to the local region (455). Methods for selecting the local reference vectors are known in the art. The unmixing results in an array of stain channel images for each region. Finally, the regional stain channel images are combined (475) into a single image for each stain channel. The result is an unmixed set of stain channel images that have been unmixed according to the local properties of the multi-channel image.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provides one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include any type of non-transitory storage media, such as volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an Internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the Internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As used herein, the term "about" refers to plus or minus 10% of the referenced number.

Various modifications of the disclosure, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present disclosure, it will be readily apparent to those skilled in the art that modifications may be made thereto which do not exceed the scope of the appended claims. Therefore, the scope of the disclosure is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the disclosures described herein using the phrase "comprising" includes embodiments that could be described as "consisting of", and as such the written description requirement for claiming one or more embodiments of the present disclosure using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

The invention claimed is:

1. A medical image analysis method of unmixing color channels from a multi-channel image of a biological tissue sample stained with a plurality of stains, said method comprising:
   a. obtaining the multi-channel image comprising the plurality of stains;
   b. processing a pixel of the multi-channel image to generate a local focus-quality metric, wherein the local focus-quality metric indicates an estimated distance between the pixel and another pixel corresponding to an edge of an image object depicted in the multi-channel image;
   c. determining that the local focus-quality metric exceeds a predetermined threshold;
   d. in response to determining that the local focus-quality metric exceeds the predetermined threshold, classifying the pixel as being associated with a particular region of the multi-channel image,
   e. splitting the multi-channel image into a first region image that includes the particular region associated with pixel and a second region image that does not include the particular region;
   f. for the first region image, determining a first plurality of reference vectors for unmixing the first region image;
   g. for the second region image, determining a second plurality of reference vectors for unmixing the second region image, wherein the first plurality of reference vectors for unmixing the first region image include color-channel values that are different from color-channel values of the second plurality of reference vectors for unmixing the second region image;
   h. unmixing the first region image using the first plurality of reference vectors to generate a first individual stain channel image;
   i. unmixing the second region image using the second plurality of reference vectors to generate a second individual stain channel image; and
   j. combining the first and second individual stain channel images to generate a combined stain channel image for the multi-channel image.

2. The method of claim 1, wherein the first region image comprises pixels that are classified as in-focus and the second region image comprises pixels that are classified as out-of-focus.

3. The method of claim 1, wherein processing a pixel of the multi-channel image to generate a local focus-quality metric comprises:
   a. creating a single channel image from the multi-channel image;
   b. filtering the single channel image with a Laplacian-of-Gaussian filter;
   c. regulating the Laplacian-of-Gaussian filter with a median filter, thereby resulting in a filtered image;
   d. classifying a first set of pixels of the multi-channel image whose value in the filtered image is below a threshold indicating an out-of-focus class;
   e. classifying a second set of pixels of the multi-channel image whose value in the filtered image is above a threshold indicating an in-focus class; and
   f. reclassifying the pixel within an adjustable radius of a pixel of the second set of pixels.

4. A method of unmixing color channels from a multi-channel image, said method comprising:
   a. obtaining the multi-channel image comprising a plurality of color channels mixed together;
   b. classifying a pixel of the multi-channel image as being associated with an in-focus region or an out-of-focus region by:
      i. identifying a feature vector corresponding to the pixel, wherein the feature vector characterizes a color intensity of the pixel;
      ii. identifying a set of pixels that are within a predetermined distance to the pixel; and
      iii. using the feature vector to classify the pixel and the set of pixels as being associated with the in-focus region;
   c. splitting the multi-channel image into a first region image that includes the in-focus region and a second region image that includes the out-of-focus region, wherein the pixel and the set of pixels are associated with the first region image;

d. for the first region image, determining a first plurality of reference vectors for unmixing the first region image;

e. for the second region image, determining a second plurality of reference vectors for unmixing the second region image, wherein the first plurality of reference vectors for unmixing the first region image include color-channel values that are different from color-channel values of the second plurality of reference vectors for unmixing the second region image;

f. unmixing the first region image using the first plurality of reference vectors to generate a first individual stain channel image;

g. unmixing the second region image using the second plurality of reference vectors to generate a second individual stain channel image; and h. combining the first and second individual stain channel images to generate a combined stain channel image for the multi-channel image.

5. The method of claim 4, wherein classifying the multi-channel image further comprises:

a. generating a plurality of feature images from the multi-channel image;

b. generating a plurality of feature vectors that includes the identified feature vector, wherein each feature vector of the plurality of feature vectors comprises a plurality of pixels formed by selecting a pixel at a same location in each feature image and assembling them into an array;

c. classifying the pixel using the feature vector; and d. applying a regularization filter such that the set of pixels within the predetermined distance to the pixel are assigned to a same classification as the pixel.

6. The method of claim 5, wherein a supervised classification process is utilized to classify the pixel, said supervised classification process comprising:

a. reading a set of annotated example images, wherein one or more pixels of an annotated example image of the set of annotated example images are annotated as examples of pure stains, wherein an annotation for each of the one or more pixels of the annotated example image comprises a classification identification for that pixel, wherein the classification identification for that pixel includes an in-focus classification and an out-of-focus classification;

b. generating a plurality of feature images for each annotated example image of the set of annotated example images;

c. generating a feature vector for each annotated pixel, wherein the feature vector comprises the plurality of pixels formed by selecting the pixel at the same location in each feature image;

d. combining the feature vectors with the classifications from the annotation to produce a set of classification data;

e. training a supervised learning algorithm using the set of classification data to predict a classification corresponding to each annotated example image of the set of annotated example images; and f. applying the trained supervised classification algorithm to the feature vector of each pixel in the multi-channel image, thereby producing a classification for each pixel in the feature image.

7. The method of claim 5, wherein a non-supervised classification process is utilized to classify the pixel, said non-supervised classification process comprising applying a clustering mapping process to the plurality of feature vectors of the plurality of feature images to generate a cluster map of the multi-channel image, wherein a region of the cluster map of the multi-channel image indicates a classification for the pixel, wherein all pixels within a same region of the cluster map are assigned to a corresponding classification.

8. A medical image analysis system for unmixing color channels from a multi-channel image of a biological tissue sample stained with a plurality of stains, said system comprising:

a. an image acquisition and storage system;

b. a processor operatively coupled to the image acquisition and storage system; and c. a memory operatively coupled to the processor, configured to store digitally-encoded instructions that, when executed by the processor, cause the processor to perform operations comprising:

i. obtaining, from the image acquisition and storage system, the multi-channel image comprising the plurality of stains;

ii. processing a pixel of the multi-channel image to generate a local focus-quality metric, wherein the local focus-quality metric indicates an estimated distance between the pixel and another pixel corresponding to an edge of an image object depicted in the multi-channel image;

iii. determining that the local focus-quality metric exceeds a predetermined threshold;

iv. in response to determining that the local focus-quality metric exceeds the predetermined threshold, classifying the pixel as being associated with a particular region of the multi-channel image:

v. splitting the multi-channel image into a first region image that includes the particular region associated with pixel and a second region image that does not include the particular region;

vi. for the first region image, determining a first plurality of reference vectors for unmixing the first region image;

vii for the second region image, determining a second plurality of reference vectors for unmixing the second region image, wherein the first plurality of reference vectors for unmixing the first region image include color-channel values that are different from color-channel values of the second plurality of reference vectors for unmixing the second region image;

viii. unmixing the first region image using the first plurality of reference vectors to generate a first individual stain channel image;

ix. unmixing the second region image using the second plurality of reference vectors to generate a second individual stain channel image; and x. combining the first and second individual stain channel images to generate a combined stain channel image for the multi-channel image.

9. The system of claim 8, wherein the first region image comprises pixels that are classified as in-focus and the second region image comprises pixels that are classified as out-of-focus.

10. The system of claim 8, wherein processing a pixel of the multi-channel image to generate a local focus-quality metric comprises:

a. creating a single channel image from the multi-channel image;

b. filtering the single channel image with a Laplacian-of-Gaussian filter;

c. regulating the Laplacian-of-Gaussian filter with a median filter, thereby resulting in a filtered image;

d. classifying a first set of pixels of the multi-channel image whose value in the filtered image is below a threshold indicating an out-of-focus class;

e. classifying a second set of pixels of the multi-channel image whose value in the filtered image is above a threshold indicating an in-focus class; and f. reclassifying the pixel within an adjustable radius of a pixel of the second set of pixels.

11. A non-transitory computer-readable storage medium storing instructions for unmixing color channels from a multi-channel image, wherein the instructions, when executed by one or more processors of a medical image system, cause the medical image system to perform operations comprising:

a. obtaining, from an image acquisition and storage system, the multi-channel image comprising a plurality of color channels mixed together;

b. classifying a pixel of the multi-channel image as being associated with an in-focus region or an out-of-focus region by:

i. identifying a feature vector corresponding to the pixel, wherein the feature vector characterizes a color intensity of the pixel;

ii. identifying a set of pixels that are within a predetermined distance to the pixel; and iii. using the feature vector to classify the pixel and the set of pixels as being associated with the out-of-focus region;

c. splitting the multi-channel image into a first region image that includes the in-focus region and a second region image that includes the out-of-focus region, wherein the pixel and the set of pixels are associated with the first region image;

d. for the first region image, determining a first plurality of reference vectors for unmixing the first region image;

e. for the second region image, determining a second plurality of reference vectors for unmixing the second region image, wherein the first plurality of reference vectors for unmixing the first region image include color-channel values that are different from color-channel values of the second plurality of reference vectors for unmixing the second region image;

f. unmixing the first region image using the first plurality of reference vectors to generate a first individual stain channel image;

g. unmixing the second region image using the second plurality of reference vectors to generate a second individual stain channel image; and h. combining the first and second individual stain channel images to generate a combined stain channel image for the multi-channel image.

12. The non-transitory computer-readable storage medium of claim 11, wherein classifying the multi-channel image further comprises:

a. generating a plurality of feature images from the multi-channel image;

b. generating a plurality of feature vectors that includes the identified feature vector, wherein each feature vector of the plurality of feature vectors comprises a plurality of pixels formed by selecting a pixel at a same location in each feature image and assembling them into an array;

c. classifying the pixel using the feature vector; and d. applying a regularization filter such that the set of pixels within the predetermined distance to the pixel are assigned to a same classification as the pixel.

13. The non-transitory computer-readable storage medium of claim 12, wherein a supervised classification process is utilized to classify the pixel, said supervised classification process comprising:

a. reading a set of annotated example images, wherein one or more pixels of an annotated example image of the set of annotated example images are annotated as examples of pure stains, wherein an annotation for each of the one or more pixels of the annotated example image comprises a classification identification for that pixel, wherein the classification identification for that pixel includes an in-focus classification and an out-of-focus classification;

b. generating a plurality of feature images for each annotated example image of the set of annotated example images;

c. generating a feature vector for each annotated pixel, wherein the feature vector comprises the plurality of pixels formed by selecting the pixel at the same location in each feature image;

d. combining the feature vectors with the classifications from the annotation to produce a set of classification data;

e. training a supervised learning algorithm using the set of classification data to predict classification corresponding to each annotated example image of the set of annotated example images; and f. applying the trained supervised classification algorithm to the feature vector of each pixel in the multi-channel image, thereby producing a classification for each pixel in the feature image.

14. The non-transitory computer-readable storage medium of claim 12, wherein a non-supervised classification process is utilized to classify the pixel, said non-supervised classification process comprising applying a clustering mapping process to the plurality of feature vectors of the plurality of feature images to generate a cluster map of the multi-channel image, wherein a region of the cluster map of the multi-channel image indicates a classification for the pixel, wherein all pixels within a same region of the cluster map are assigned to a corresponding classification.

* * * * *